United States Patent [19]

Schwaiger

[11] 3,875,793

[45] Apr. 8, 1975

[54] DEVICE FOR MEASURING THE BRAKE TORQUE OF MOTOR VEHICLES AND TRAILER BRAKES

[76] Inventor: Heinz Schwaiger, Gunzenhauserstrasse 6, D-8051 Eching/Bundesrep., Germany

[22] Filed: Dec. 12, 1973

[21] Appl. No.: 423,987

[30] Foreign Application Priority Data
Dec. 18, 1972 Germany.......................... 2261897

[52] U.S. Cl. .................................. 73/131; 73/139
[51] Int. Cl. ............................................ G01m 17/00
[58] Field of Search ..., ........................... 73/131, 139

[56] References Cited
UNITED STATES PATENTS
1,848,487 3/1932 Linendoll .......................... 73/131
2,000,289 5/1935 Kramer ........................ 73/131 X Primary Examiner—Jerry W. Myracle
Attorney, Agent, or Firm—Hammond & Littell

[57] ABSTRACT

The invention concerns a device for measuring the brake torque of motor vehicle brakes and trailer brakes by means of which a torque is exerted on the circumference of a wheel, whose brake has previously been set, with a bending rod whose one rigid end can be connected over a slip-on opening to a drive shaft acting at least indirectly on the wheel circumference, and to the other end of which can be applied a force generating a wheel driving torque which produces a proportional deflection of this bending rod end.

8 Claims, 6 Drawing Figures

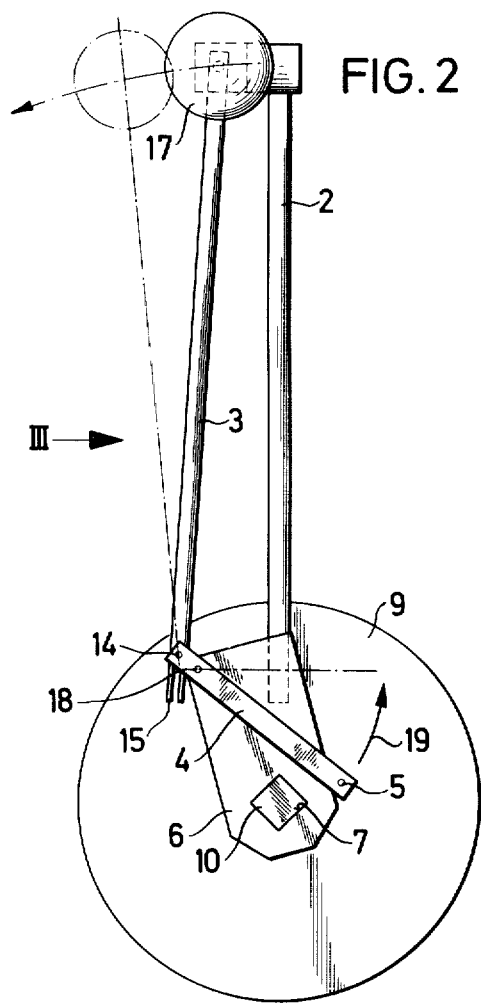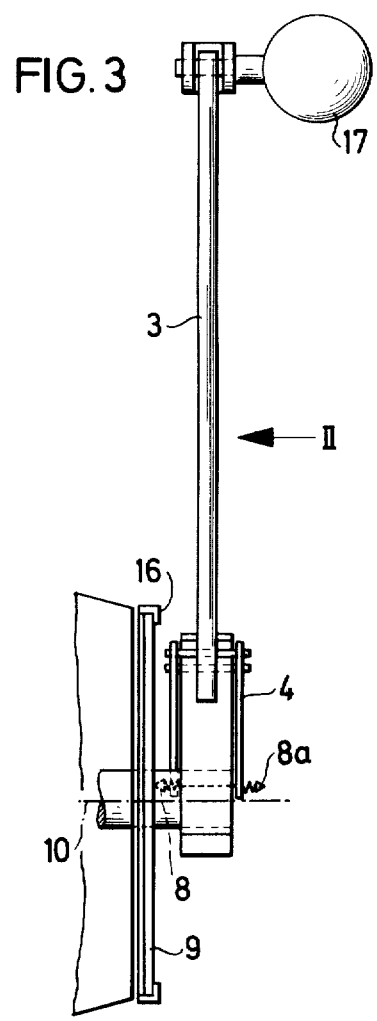

FIG. 4
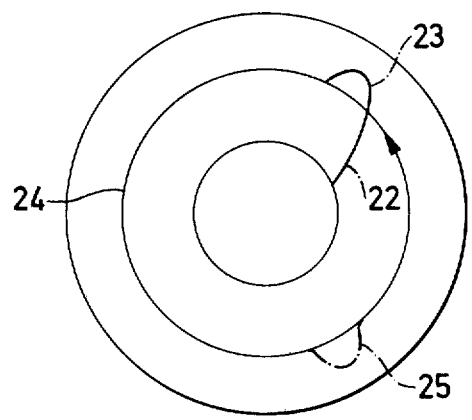
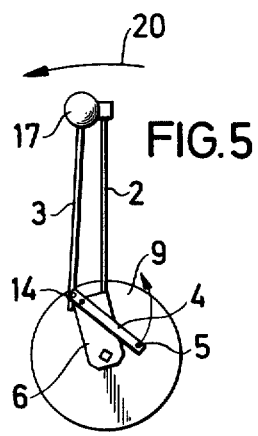
FIG. 5
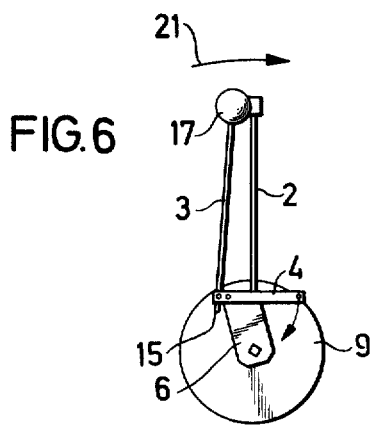
FIG. 6

DEVICE FOR MEASURING THE BRAKE TORQUE OF MOTOR VEHICLES AND TRAILER BRAKES

THE PRIOR ART

Motor vehicle testing stands are already known in which the motor vehicle is placed with its wheels on rollers and numerous functions of the motor vehicle including the brake torque are tested with very complicated electronic devices. These testing stands are very expensive and their investment costs exceed the financial capabilities of many smaller workshops and gas stations.

In order to satisfy the need of smaller workshops and the service departments of gas stations, a simple brake testing device has already been developed. The known device includes a frame provided with casters and which has two rollers that can receive a vehicle. After the car wheel is placed onto these rollers, the brake of the vehicle must then be set by means of the brake pedal. A torque wrench is then attached on the drive shaft of one of these rollers. This torque wrench has a bending rod which has a handle at the upper end. After a force is applied and then increased, a so-called drag pointer is utilized to indicate the torque holding the brake which must be overcome so that the wheel can turn. When the force is applied, the pointer is engaged; and after the application of the force is stopped, the drag pointer is also stopped at this corresponding torque value, which can then be read.

This known device has the disadvantage that it does not properly measure the sliding moment of the brake, which is of interest here. Instead it measures the so-called "initial breakaway torque" which must be applied so that the brake drum can rotate with respect to the brake shoes. This breakaway torque is greater than the sliding moment of the brake. This breakaway torque can vary within a pair of wheels for various reasons, even though the sliding moments of the brakes, which are less than the breakaway torque, are the same. If such a condition is found with the known brake tester, the brakes would be reset, although this would not at all be necessary. It is thus a great disadvantage of the known prior art device that only the breakaway torque can be determined, but that the sliding moment cannot be determined.

OBJECTS OF THE INVENTION

It is an object of the present invention to provide a simple and reliable device which can be utilized to determine both the breakaway torque and subsequently the sliding moment.

It is another object of the present invention to provide a device for measuring the brake torque of motor vehicle brakes and trailer brakes by means of which a torque is exerted on the circumference of a wheel, whose brake has previuosly been set, with a bending rod whose one rigid end can be connected over a slip-on opening to a drive shaft acting at least indirectly on the wheel circumference, and to the other end of which can be applied a force generating a wheel driving torque which produces a proportional deflection of this bending rod end.

These and other objects of the present invention will become apparent as the description thereof proceeds.

The present invention will be described more fully by reference to the following drawings which are not to be deemed limitative in any manner thereof.

THE DRAWINGS

FIG. 2 shows a front view of the device.

FIG. 3 shows a side view of the device.

FIG. 4 shows a top view of a recording disc with a recorded diagram and

FIGS. 5 and 6 show different methods of operation of the device.

DESCRIPTION OF THE INVENTION

Figure 1:
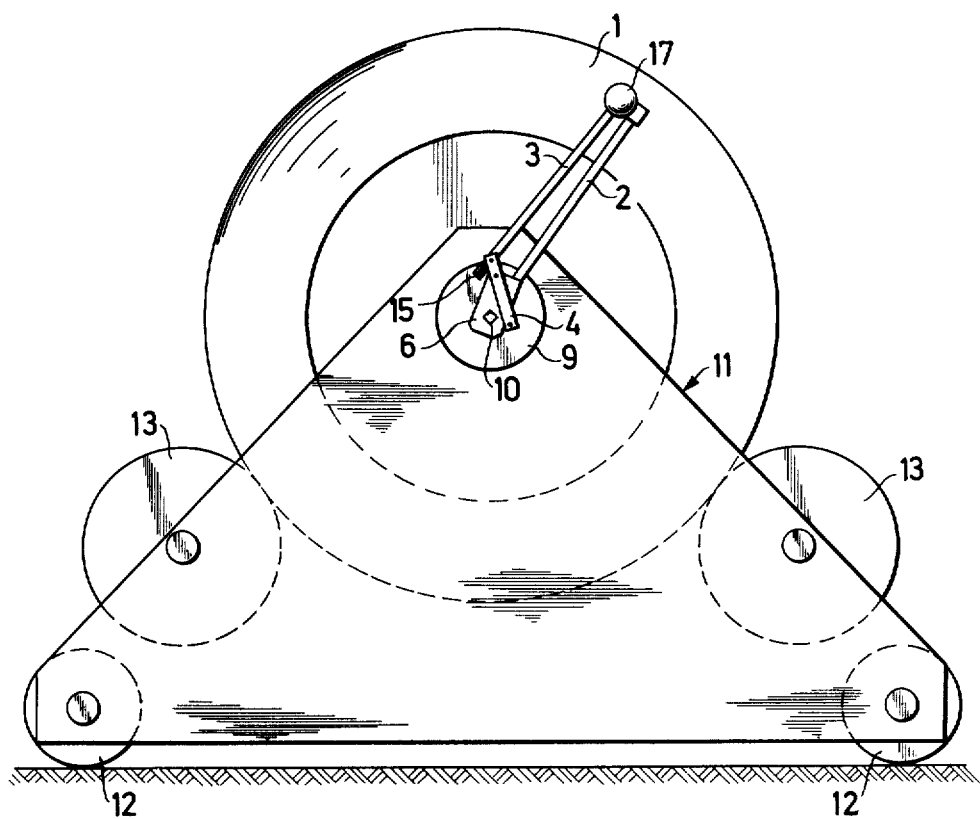
FIG. 1 shows a stand for a motor vehicle in which the above-described device can be used.

FIG. 1 shows a stand which has a frame 11. On this frame are provided casters 12 by which the frame can be moved from place to place. This frame also has a wheel driving roller 13 onto which a vehicle wheel 1 can be positioned. The frame also has a drive shaft 10 which can be connected to a drive means, not shown, for example. Drive shaft 10 is then connected to one or both of the wheel driving rollers 13 by a drive means, not shown, to transmit a torque from the drive shaft 10 through the wheel driving rollers 13 to the circumference of vehicle wheel 1.

The gearing of the drive means may be such as to permit one complete revolution of the vehicle wheel when the brake torque device is turned through 360° in order to detect any braking defects within the braking system which would be indicated, as will be discussed hereinbelow.

In the brake test it is of interest to measure the so-called "brake sliding moment" in each wheel of a pair of wheels. In order to measure this brake sliding moment, the wheel 1 of a motor vehicle is placed onto the wheel driving rollers 13 and then the vehicle brake is applied with the brake pedal. By means of the brake torque device, a torque is applied to the shaft 10, by means of turning the device in the manner of a crank to effect at least a 360° rotation of the shaft 10.

As shown in FIG. 2 the brake torque device has a bending rod 2 which has a rigid end shaped as a head plate 6 within which is provided a slip-on opening 7, which can be square or hexagonal, for example. With this slip-on opening 7, the device is attached onto the end of the drive shaft 10. At the other end of bending rod 2 is arranged a handle 17 which can be interchangeable, for example.

A rocking lever 4 is rotatably mounted onto the head plate 6 by means of pin 18. One end of this rocking lever 4 carries a recording means 5, including a recording pen 8. The other end of this rocking lever 4 is articulated, or hinge-connected, to one end of a rigid transmission lever 3. This hinge-connection consists of a pin 14 on the rocking lever and of a receiving slot 15 at the end of a rigid transmission lever 3. This transmission lever 3 is in turn connected to the force absorbing end of the bending rod 2. This connection can be rigid.

When the brake torque device is attached to frame 11 by placing its slip-on opening 7 over shaft 10, and when a recording disc 9 is positioned onto frame 11 in a stationary fashion but yet in a detachable manner by means of a clamping ring 16 which surrounds the drive shaft 10, a curve can be drawn on the recording disc 9 as is shown in FIG. 4.

When a force is applied to the handle 17 in the direction of arrow 20 of FIG. 5, a torque is transmitted to the shaft 10 and thus to the circumference of the wheel. Because of this transmission the upper end of the bending rod 2 is proportionally deflected and this deflection is transmitted by the transmission lever 3 to the rocking lever 4. The end of the rocking lever 4 carrying the recording means 5 moves in the direction of arrow 19, at the same time the recording means performs a counterclockwise rotation about the drive shaft 10. In this operating phase the curve leg 22 is recorded as shown in FIG. 4. When the force is increased to such an extent that the brake drum rotates with respect to the brake shoes, the point 23 in the graphic representation in FIG. 4 has been reached. This point 23 corresponds to the breakaway torque. After the breakaway torque has been attained, the torque necessary for the further rotation of the wheel 1 decreases to the value indicated by the curve 24. This is the so-called sliding moment, which is of great importance for the evaluation of the operation of the vehicle brake system. This sliding moment remains substantially constant if the bending rod 2 is turned through 360°. If recording points are obtained in the diagram as shown at 25, these are irregularities in the torque, which always indicate defects in the vehicle brake system.

In a further embodiment, the disc 9 can be provided in a simple manner with a calibrated scale so that the breakaway torque and the sliding moment can be read immediately.

It is also possible with the device to apply a force in the direction of arrow 21, as shown in FIG. 6. If the device is used in this manner, the recording tip moves in the direction of arrow and records from the outside to the inside of the disc 9, instead of from the inside to the outside and a correspondingly calibrated recording disc must be used here.

As shown in FIG. 3, a recording pen 8a can also extend in the other direction, so that it is not necessary to arrange a recording disc 9 on the frame 11 by means of a clamping ring 16. This recording disc 9 can also be placed on a stand ahead of the brake torque device, so that a mirror image of the recording can be obtained by means of recording pen 8a. Even though FIG. 3 shows rocking lever 4 attached on both sides of head plate 6, the rocking lever either can be attached to one of the sides of the head plate, or can be attached to both sides of the head plate.

The advantages of the present invention are as follows. With this device, which does not act in the manner of a lever over a limited angle, but which can be operated like a crank and be turned fully about its drive shaft, it is possible to immediately record a diagram which indicates the most important operating data of the brake. The diagram starts with the breakaway torque, and this breakaway torque then drops to the value of the normal brake sliding moment. This brake sliding moment must be the same, for example, for the brakes of a pair of wheels. Furthermore any defective areas in the brake will be recorded in the diagram as deviations from the brake sliding moment, which is of great advantage.

A particularly simple and stable embodiment is obtained if the rigid end of the bending rod is shaped as a head plate.

The transmission of the deflection to the rocking lever can preferably be effected if the end of the rocking lever remote from the recording means carries a pin which engages a slot provided at the end of the transmission lever.

In a further embodiment the transmission lever is rigidly connected to the force absorbing end of the bending rod which produces a more sturdy device.

The recording disc can be attached by means of a clamping ring onto a frame which carries the drive shaft.

Furthermore it is also preferable if the recording means has recording tips extending in both directions from the rocking lever. It is possible to obtain a mirror image recording of the previous recordings if the recording disc is arranged ahead of the drive shaft.

More particularly the present invention provides a device for measuring the brake torque of motor vehicle wheel brakes, or of motor vehicle trailer wheel brakes comprising means for applying a torque to the circumference of a vehicle wheel, which has already had its brake applied, said torque applying means comprising a bending rod having a rigid end adapted to be connected to a drive shaft for acting at least indirectly to apply a circumferential torque to said braked wheel, said bending rod having at the other end thereof a handle onto which a force can be applied for generating a wheel driving torque, said force producing a proportional deflection of said bending rod, a rocking lever rotatably mounted on said rigid end of said bending rod, the first end of said rocking lever being articulated to a rigid transmission lever, said transmission lever being connected to that end of said bending rod to which said handle is attached, the second end of said rocking lever carrying a recording means capable of recording both the initial circumferential torque required to move said braked vehicle wheel and the continued circumferential torque as said braked vehicle wheel is revolved.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. A device for measuring the brake torque of motor vehicle wheel brakes, or of motor vehicle trailer wheel brakes comprising means for applying a torque to the circumference of a vehicle wheel, which has already had its brake applied, said torque applying means comprising a bending rod having a rigid end adapted to be connected to a drive shaft for acting at least indirectly to apply a circumferential torque to said braked wheel, said bending rod having at the other end thereof a handle onto which a force can be applied for generating a wheel driving torque, said force producing a proportional deflection of said bending rod, a rocking lever rotatably mounted on said rigid end of said bending rod, the first end of said rocking lever being articulated to a rigid transmission lever, said transmission lever being connected to that end of said bending rod to which said handle is attached, the second end of said rocking lever carrying a recording means capable of recording both the initial circumferential torque required to move said braked vehicle wheel and the continued circumferential torque as said braked vehicle wheel is revolved.

2. The device of claim 1, in which said recording means comprises a recording tip which slides across a recording disc, said recording disc being positioned to surround the axis of said drive shaft and being held stationary thereon while being detachable therefrom.

3. The device of claim 1, in which said rigid end of said bending rod comprises a head plate.

4. The device of claim 1, in which said first end of said rocking lever articulated to said transmission lever carries a pin which engages a slot provided at the end of the transmission lever.

5. The device of claim 1, in which said transmission lever is rigidly connected to that end of said bending rod to which said handle means is attached.

6. The device of claim 1, in which there is a clamping ring for securing said recording disc to a frame carrying said drive shaft.

7. The device of claim 1, in which said recording means comprises recording tips extending from said rocking lever in both directions.

8. The device of claim 1, in which said bending rod has a rigid end containing a slip-on opening therein, and said rigid end being adapted to be slipped onto and connected to said drive shaft through said opening.

* * * * *